UNITED STATES PATENT OFFICE.

JEROME ALEXANDER, OF NEW YORK, N. Y., ASSIGNOR TO NATIONAL GUM & MICA COMPANY, OF NEW YORK, N. Y., A CORPORATION OF NEW YORK.

ART OF PRODUCING MATTER IN A FINELY-DIVIDED STATE.

1,259,708. Specification of Letters Patent. Patented Mar. 19, 1918.

No Drawing. Application filed May 1, 1914. Serial No. 835,619.

*To all whom it may concern:*

Be it known that I, JEROME ALEXANDER, a citizen of the United States, residing in the city, county, and State of New York, have invented certain new and useful Improvements in the Art of Producing Matter in a Finely-Divided State, of which the following is a specification.

It is frequently desirable in the arts to utilize matter which is in a state of extremely fine subdivision, either while in suspension in a liquid, or while in a dry or substantially dry form. Four ways have been well-recognized hitherto for the production of matter in this finely subdivided condition. They are:

1st: Grinding;
2nd: Agitation of the reacting solutions or materials;
3rd: Use of dilute solutions for precipitation;
4th: Use of protective colloids (*Schutz kolloide*).

In utilizing the fourth means referred to, it is well known that the addition of glue, gelatin, gum arabic, and similar reversible colloidal substances to one of the solutions used in making a precipitate will result in a precipitate which is in a much finer state of subdivision than that obtained without the addition of such so-called protective colloidal substance. (*Journal Society Chemical Industry*, 1909, vol. 28, pp. 280–285).

My invention has particular reference to a principle which I have discovered embodying a conception in some ways allied to but broader than that just described. I have discovered that by adding what I term a "protector" to each of or to more than one of two or more substances which combine to produce by chemical or physical agency matter which is recoverable in finely divided form, the degree of sub-division or fineness is remarkably increased.

I have thus discovered a method which is advantageously adaptable to the production of pigments, medicinal precipitates or matter in suspension, and other organic or inorganic substances in a finely divided state having industrial, medicinal or dietetic uses, among which are included paints, inks, insecticides and catalytic metals. My invention is also adapted for use in connection with water purification for steam boiler protection.

As an example of the application of my improvement where the protector is a colloid, I may take the precipitation of orange II pigment or lake by means of a given amount of barium chlorid. If to one of the components prior to precipitation is added a given amount of colloid, for instance, gum arabic, there is obtained a precipitate which is finer in its state of subdivision or suspensibility than that resulting when no colloid is added. If, however, I divide the same weight of the colloid (in this case gum arabic) equally between each of the components prior to their combination or mingling, the precipitate produced is characterized by a degree of fineness or of subdivision which is remarkably greater than that achieved when the colloid (protector) is added to only one of the components, as in the second instance cited.

The essence of my discovery I believe to reside in the fact that what I term the "protector" is added to each of or to more than one of the components of the desired substance prior to the physical or chemical mingling or to the reacting of these components. In many instances, this protector is a colloid, as in the example just given, but I realize that the protector may be a crystalloid which exerts an influence retarding or preventing the formation of aggregates or considerable masses of the desired substance. Such a crystalloid is sodium citrate. It will be obvious that the same protector need not be added to more than one of the components, for in some cases it may be desirable or necessary to add one protecting substance to one component, and a different protecting substance to another component, because of the possible chemical or physical effects of different protectors on different components independent of or prior to the reaction of said components upon each other.

I regard my invention as of the widest application and essentially as the double or plural protection of the components of a suspension. This "suspension" may not only be a solid suspended in a liquid, as in the case of an ordinary colloidal precipitate, but also embraces a fluid suspended in a fluid, as an emulsion, and it also covers a solid produced in the form of a suspension by the use of the principle of plural protection above described, from which the fluid originally acting as a suspending vehicle has been removed from the desired suspended solid, the resulting dry or substantially dry solid in this case being the ultimate substance sought. Furthermore, my invention may be utilized in connection with a solid suspended in a solid, as in the case of an alloy, in which the degree of subdivision of the individual particles is of great importance. It will thus be apparent that wherever I have used the word "suspension" in this specification or in the appended claims, unless otherwise restricted, it includes not only matter suspended in a liquid or other fluid, but also matter in a substantially dry form capable of being put in suspension on the mere incorporation with the liquid or other fluid used in the production of the original suspension or in a different fluid. In other words, the terms precipitates, suspensions, or emulsions in this case are to be broadly interpreted, and furthermore are not to be restricted to chemical interaction or to the result of such interaction, and I wish to expressly include such substances in a high state of subdivision which are produced simply by altering the solvent power of a dissolving menstruum or solvent by adding thereto a liquid or other fluid in which the dissolved material is less soluble, or by removing something and thus altering the solubility.

To illustrate further the nature of my invention, I have appended two examples which will serve to set forth some of the benefits which inhere in my method, but in doing so I desire to have it distinctly understood that I do not limit myself to the exact proportions or amounts or kinds of material mentioned, nor by giving these examples do I limit the application of my invention to the arts with which the subjects of these examples are allied:

Example I.

Dissolve twenty (20) parts of the dye commonly known as orange II and one (1) part of gum arabic in four hundred (400) parts of water. Dissolve forty (40) grams of barium chlorid and two (2) parts of gum arabic in eight hundred (800) parts of water. Add sufficient of the barium chlorid solution to the orange II solution to produce complete precipitation of the color. The precipitate obtained is then ready for use in the usual manner.

To show by contrast the benefits of my invention, three (3) parts of gum arabic may be added to either of the original solutions and none to the other. Upon combining these solutions the degree of fineness of the precipitate will be found very inferior to that of the precipitate obtained by the method in which the protector is added to both the reacting solutions.

Example II.

Dissolve twenty (20) parts of barium sulfid and one (1) part of gelatin in four hundred (400) parts of water. Dissolve forty (40) parts of zinc sulfate and two (2) parts of gelatin in eight hundred (800) parts of water. Add sufficient of the zinc sulfate solution to the barium sulfid solution to produce complete precipitation of the barium sulfid. The precipitate thus obtained will be found far superior in fineness to that obtained by the reaction of solutions of similar proportions, in which gelatin is added to neither or to only one of the reacting components.

In this specification and in the appended claims I have used the word "protector" in the sense of a substance which substantially retards or prevents, or tends to prevent, the massing or agglutination of a suspended product. As already pointed out, this "protector" may be either of a colloidal or of a non-colloidal nature.

Wherever I have used the word "components" or "component" in this specification or any part of it or the claims thereto annexed, I mean to include within the scope of such word all such materials from or by which the new substance or suspension is produced or which enter in part or in whole into the composition of the new substance or suspension produced.

This new process further enables the use of more highly concentrated solutions than those which can be used when no protector is added or when a protector is added to only one of the components of the resulting substance.

Having thus described my invention, but without desiring to limit myself in any way to the precise examples, which are merely given by way of illustration, I claim:

1. The method of producing a compound substance in a finely divided state which comprises adding a colloidal protector to more than one of the components and mixing said components or causing them to react.

2. The method of producing a compound substance in a finely divided state which comprises adding a protector to each of the components and mixing said components or causing them to react.

3. The method of producing a compound substance in a finely divided state which comprises adding a colloidal protector to each of the components and mixing said components or causing them to react.

4. The method of producing a compound substance in a finely divided state which comprises adding a protecting colloid to a solution containing a component of said substance, adding a protecting colloid to a solution containing a further component of said substance, and causing said protected components to react to produce the desired substance.

5. The art of double colloidal protection of a compound substance in a finely divided state by separately protecting each before bringing them together.

6. The step in the protection of a compound substance in a finely divided state which comprises the plural protection of its components prior to their reaction.

7. The method of producing a compound substance in suspension in a finely divided state which comprises adding a protecting colloid to more than one of its components and mixing said components or causing them to react.

8. The suspension of a compound substance whose components have been severally protected, colloidally.

9. The suspension of a compound substance whose components are mutually protected.

10. The method of producing a compound substance in a finely divided state which comprises adding a protector to more than one of its components and mixing such components or causing them to react.

11. The suspension of a compound substance, more than one of whose components are mutually protected from the other components.

12. The suspension of a compound substance, more than one of whose components have been colloidally protected against the other components.

JEROME ALEXANDER.

Witnesses:
  GERALD E. TERWILLIGER,
  CLARA KUJAWA.